United States Patent [19]

Walker

[11] Patent Number: 4,807,894

[45] Date of Patent: Feb. 28, 1989

[54] TRAILERABLE STRUCTURE AND COMPONENTS FOR USE THEREWITH

[76] Inventor: Douglas W. Walker, 2513 Borrego Dr., Durango, Colo. 81301

[21] Appl. No.: 126,768

[22] Filed: Nov. 30, 1987

[51] Int. Cl.⁴ .............................................. B62D 61/00
[52] U.S. Cl. ....................................... 280/63; 280/656
[58] Field of Search ............... 280/656, 695, 700, 717, 280/427, 430, 431

[56] References Cited

U.S. PATENT DOCUMENTS

| | | | |
|---|---|---|---|
| 2,834,599 | 5/1958 | Sarchett | 280/415 R X |
| 3,022,086 | 2/1962 | Allen | 280/30 |
| 3,179,438 | 4/1965 | Field | 280/43.14 |
| 3,523,698 | 8/1970 | Bishop | 280/766.1 |
| 3,795,336 | 3/1974 | Acker et al. | 280/43.23 X |
| 3,832,932 | 9/1974 | Even et al. | 280/43.23 |
| 3,834,111 | 9/1974 | Acker et al. | 414/786 X |
| 4,126,324 | 11/1978 | Browning | 280/656 |
| 4,175,768 | 11/1979 | Thackray | 280/656 X |
| 4,366,650 | 1/1983 | Patterson | 280/43.24 X |

*Primary Examiner*—David M. Mitchell
*Assistant Examiner*—Michael Mar
*Attorney, Agent, or Firm*—Donald W. Margolis

[57] ABSTRACT

A simple trailer frame is provided which may be included within a structure, and which allows the frame or the structure to be easily and quickly converted into a mobile trailer on detachable wheel assemblies, without the need for tools. The components and assemblies are also quickly and easily removed from the structure without the need for tools. When the frame is used within a structure, once the structure is at its use site it need show very little evidence that it was a trailer. Also included in the frame is a towing member receiving member for quick and easy attachment and detachment of a towing member to the frame without the need for tools. A mechanical linkage may be provided in the frame in combination with wheel receiving members so that proper connection of the towing member to the frame locks the wheel assemblies in place on the frame. As a safety precaution, the design may also include a provision so that the towing member cannot be secured to the structure unless the wheel assemblies are fully and properly locked to the frame. Details of wheel assemblies, light assemblies and other trailer components which are quickly and easily removably attached to the trailer system or frame by a single individual without the need for tools are provided. Self-contained lifting and lowering components, such as jacks, may also be included as an integral part of the frame or the structure.

16 Claims, 9 Drawing Sheets

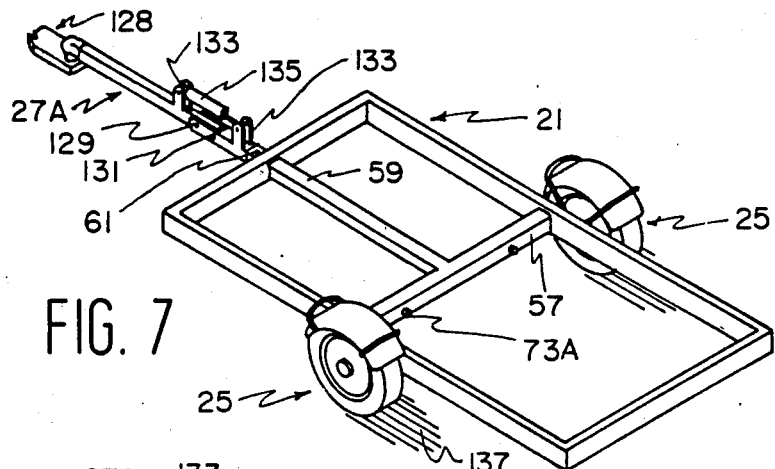
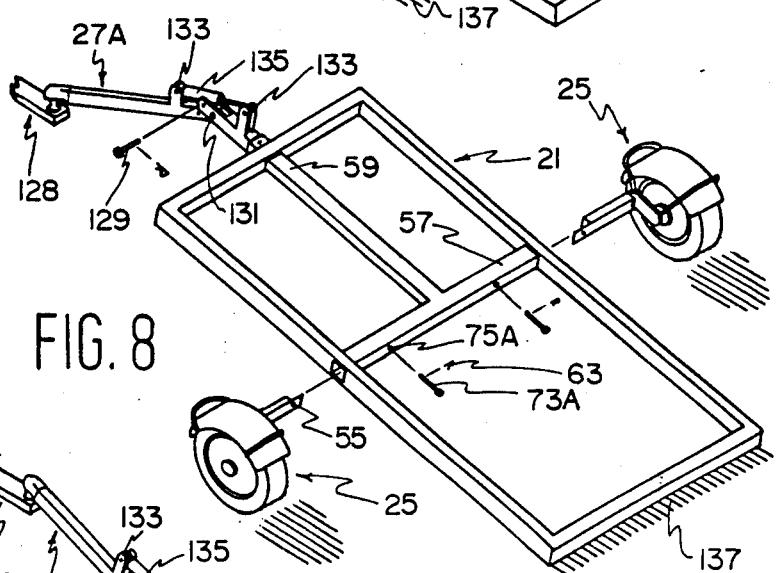
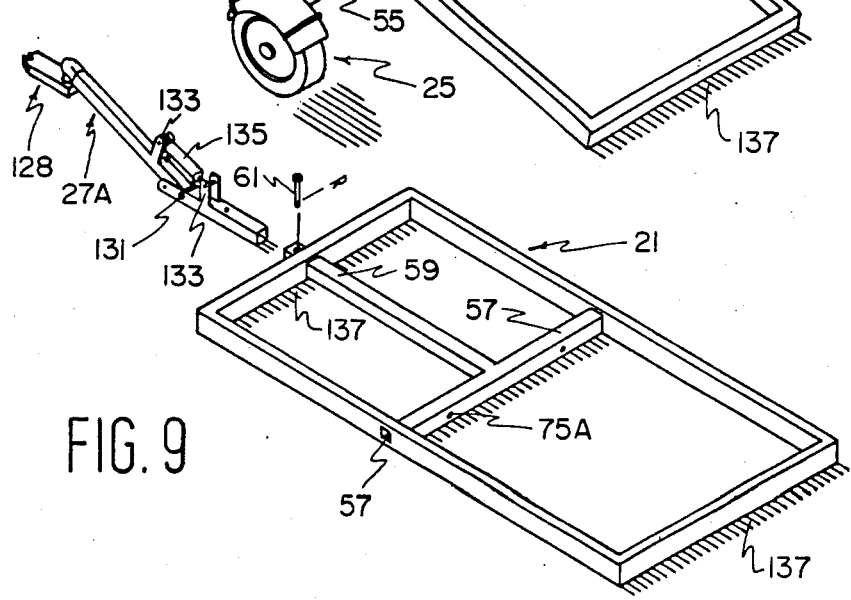

TRAILERABLE STRUCTURE AND COMPONENTS FOR USE THEREWITH

BACKGROUND OF THE INVENTION a. Field of the Invention

The present invention relates to trailerable structures with transporting features. More specifically the present invention relates to an improved frame, which may be included within a structure, which frame or structure is capable of being converted to towable trailer system, and to removable wheel assemblies and other removable components which allow such a frame or structure to be easily, quickly and safely converted into a trailer without the need for tools; and, when such a frame or structure is not being trailered, they show little evidence that they are trailerable.

b. Discussion of the Prior Art

Heretofore, most movable structures have required loading or mounting on separate wheeled carriers, such as trailers, for transportation. When such structures are large or heavy, loading and unloading them from a trailer frequently requires the use of hoists, lifts, or ramps, all of which may present special safety risks and require expensive equipment. The frames of structures which are frequently loaded on to and removed from trailers usually have design or reinforcement features which allow them to withstand the stresses of being hoisted, loaded, and unloaded. Such design or reinforcement features may add to the cost of such structures. Also, it is often necessary to design and construct expensive custom trailers to transport structures which are large or which have unusual shapes. After a structure is unloaded from a trailer, storage of the trailer may be a problem.

The disadvantages of using separate trailers to transport separate structures have led to some other attempted solutions. Many structures have been designed as trailers with wheels permanently affixed to them. When moved, such permanently wheeled structures are used with the trailer's wheels and other components in place. This may be detrimental to the intended use of the structure at its use site, as the exposed wheels, fenders, lights and other components may have an adverse affect on its appearance. This may be especially detrimental when the structure is intended for use, for example, in making sales or for use at a social function. Furthermore, structures permanently mounted on wheels are usually raised significantly above the ground level, thus creating a safety hazard for people entering and leaving the structures. Additionally, because of their mobility, structures on wheels are easily subject to theft. When wheel structures are integrated with boats and other floating structures their hydrodynamic use is generally compromised.

Another solution to this problem has been to build trailers with retractable wheels, for example as shown in Even, et al. U.S. Pat. No. 3,832,932. The system of this reference is designed for a rocket launching trailer which includes a chassis which is pivotally carried by a turret having feet adapted to be lowered to the ground surface, this lowering being associated with the raising of the wheels above the ground by jacks between the chassis and the wheels. Neither the wheels nor any of the other trailering components are intended to be removable at the site of use. The turret feet are separately adjustable to provide a stable base for the rocket launcher. While this design does provide stability to the structure when it is used, the appearance, the complexity, and the cost of manufacture are disadvantages to this prior art structure for most domestic applications to trailerable structures.

Another trailer system is taught in Patterson, U.S. Pat. No. 4,366,650. The design of the structure of this reference allows a drilling system to be moved between drilling sites. At the use site the wheels are lifted from the ground and stored in the structure, to allow part of the structure to be lowered to the ground while the remainder of the structure is suspended considerably above the ground. While this arrangement may work well for a drilling rig, it does not solve the portability problems of most domestic structures. For example, the working platform structure does not lower to ground level, the system is not attractive, and when the wheels are retracted and stored in the structure they use substantial space within the structure.

Field U.S. Pat. No. 3,179,438 discloses a toggle actuated caster wheel system.

Three references have been found which address trailer systems having removable components. Sarchett U.S. Pat. No. 2,834,599 has a chassis arrangement including a bed frame, wheels, suspension, and a towing member, which allow a trailer body house to be transported thereon. When at its use site, the trailer body house is raised from the frame by the use of separate jacks, thereby allowing the withdrawal of the trailer chassis components out form beneath the trailer body. However, the withdrawn trailer chassis components constitute a complete trailer with a substantially permanently attached wheel assembly system. Additionally, fender wells remained exposed on the trailer body house structure at the use site, and attachment and detachment of lights licenses and other trailer components does not appear to be contemplated. Acker, et al. U.S. Pat. No. 3,795,336 and its divisional U.S. Pat. No. 3,834,111 disclose, respectively, building module transporters which use detachable module carrier components which are mechanically attached directly to the end walls of the modules which they carry, and the method of using the transporters. One of the module carrier components includes wheels for ground transportation, while the other module carrier component is supported by the fifth wheel of a towing vehicle. The transporters are intended to be used with building modules which are carried only one-time to a building location, and the module carrier components are not designed for quick and easy attachment and detachment from the building modules. Furthermore, the system neither provides nor teaches the use of a frame having receiving members to which the module carrier components, such as the wheel assemblies or a towing bar, can be quickly and easily attached, nor such a frame which can be incorporated into a to-be-moved structure.

Additionally, Century Industries Inc. of Sellersburg, Ind. is known to have advertised a trailerable structure which has wheel wells and wheels which are retractable into such wells at the use site. But, as with some of the previously discussed structures, the wheels and suspension system occupy valuable space within the structure. Such a system is especially unsuitable for use with small structures because of the substantial amount of storage space required for the wheels and suspension assembly in the structure.

Some removable trailer components have been widely available and include: removable towing tongues, especially on house trailers; large trailer components, as used for moving houses; half trailers, as used for towing disabled motor vehicles; and temporary clamp on trailer lights. All of these arrangements are very specialized and have very limited uses.

It is therefore seen that none of the known prior art provides a simple and inexpensive trailer frame which may be included within a structure, and which allows such a frame or structure to be easily, quickly and safely converted into a trailer without the need for tools; and, when not being trailered with little evidence that the structure is trailerable.

SUMMARY OF THE INVENTION

Therefore, it is an object of the present invention to provide a simple and inexpensive trailer frame which may be included within a structure, and which allows the frame or the structure to be easily, quickly and safely converted into a trailer without the need for tools; and which, when included within a structure, will show very little evidence that it was a trailer, once it is at its use site.

It is another object of the present invention to provide a relatively inexpensive system which allows various types of otherwise static structures which include the frame assembly of the present invention to be made mobile on detachable wheel assemblies, and when required during transportation, with other detachable trailer components.

It is yet another object of the present invention to provide wheel assemblies and other trailer components which are quickly and easily attached to an inexpensive trailer frame, without the need for tools when required during transportation, and which are yet also quickly and easily removed at the site of use of the structure, also without the need for tools.

In accordance with the present invention, a trailerable support and carrying frame is provided which may be designed and positioned within a structure in a manner to make the entire structure trailerable. The frame includes a transverse portion having at least a pair of wheel assembly receiving members located on opposed sides of the transverse portion, and, when included within a structure, on opposed sides of the structure. The wheel assembly receiving members on the frame and the wheel assemblies are so designed and so constructed that a wheel assembly can normally be quickly and easily connected to and disconnected from the frame by a single individual without the need for any special tools. In preferred embodiments the trailerable structure may also include means for the quick and easy attachment and detachment of other trailer components without the need for tools.

Also included in the frame structure, intermediate the wheel receiving members, is a towing member receiving member for quick and easy attachment and detachment of a towing member to the frame without the need for tools. A mechanical linkage may be provided in the frame in combination with the wheel receiving members in a manner such that connection of the towing member with the towing member assembly receiving member locks the wheel assemblies in place. As a safety precaution, the design may also include a provision such that the towing member cannot be secured to the structure unless the wheel assemblies are fully and properly locked to the frame.

As a unique feature of the present invention, each wheel assembly component may also include suspension components, a fender, and a handle for use by an individual in quickly and easily positioning and handling the wheel assembly as it is connected to and disconnected from the wheel assembly receiving member portion of the frame. Self-contained lifting and lowering components, such as jacks, may also be included as an integral part of the frame or the structure of the present invention. Inconspicuous means for the attachment of trailer lights, license plates and other trailer components, without the need for tools, may also be provided on the structure, as required.

In operation, an otherwise static structure which includes an integral support and carrying frame having wheel assembly receiving members and a towing member receiving member, according to the present invention, is raised on self-contained jacks to a suitable height to allow wheel assemblies to be connected, without the need for tools, to the wheel assembly receiving members. In a similar manner a towing member is connected to a towing member receiving member in the frame without the need for tools. As detailed below, light assemblies may be simply, quickly and easily plugged into appropriate members carried by the structure. Then the jacks are retracted, causing the wheels to be placed in contact with the ground so that the structure can be easily trailered by connecting the towing member to a towing vehicle in the conventional manner.

At the use site the light assemblies are unplugged, the structure is again raised on its jacks to a height which allows the wheels to be quickly and easily removed by an individual, without the use of any special tools, the towing member and wheel assemblies are detached, and the jacks are retracted to allow the structure to be lowered to the ground or other support surface. The structure which has been so moved now looks and performs substantially as if it had never been a part of a trailer. The detached trailer components may all be relatively small, and are therefore easily stored separate from the structure, or may be used to trailer other structures of the type of the present invention. By the use of the trailerable structure of the present invention and the special sub-assembly components, a system is provided which can be quickly and easily operated by an individual without the need for any special tools, and without the need for separate trailers, trucks, lifts, and hoists.

The present invention has many additional advantages. It allows otherwise static structures to be easily designed or adapted to accept the support and carrying frame of the present invention. The attachable and detachable components are themselves of a design, size, shape, and weight which allows one person to easily handle them. For example, wheel assemblies may be provided for use with the present invention which individually weigh, for example, from about 10 pounds (4.5 kilograms) to about 200 pounds (91 kilograms), with average wheel assembly weights of about 60 pounds (27.3 kilograms) contemplated. While the components for use in the practice of the present invention are not limited to one size, one additional advantage of the present invention is that components of the same size will be interchangeable between more than one structure. Therefore, for a rental type of business only a small number of sets of trailer components will be necessary to transport a wide variety of structures which include, as an integral part thereof, the component receiving, support and carrying frame of the present invention. Also, structures which, according to the present invention include vertical lift jacks, can be leveled at their site of use by selective deployment of such jacks.

It is therefore seen that the present invention improves the safety, appearance, mobility, economy, efficiency, and functionability of a wide variety of trailerable structures.

For a fuller understanding of the nature and objects of the present invention, reference should be made to the following detailed description taken in conjunction with the accompanying drawings.

BRIEF DESCRIPTION OF THE DRAWINGS

The accompanying drawings illustrate complete preferred embodiments of the present invention according to the best modes presently conceived for the practical application of the principles thereof, and in which:

FIG. 7 is an isometric view of a modified embodiment of the present invention, detailing a trailerable structure with a removable, articulating towing member;

FIG. 8 is an isometric partially exploded view of the structure shown in FIG. 7 with the towing member articulated;

FIG. 9 is an isometric partially exploded view of the modified structure shown in FIGS. 7 and 8, with the wheel assemblies removed;

DESCRIPTION OF THE PREFERRED EMBODIMENTS

Figure 1:
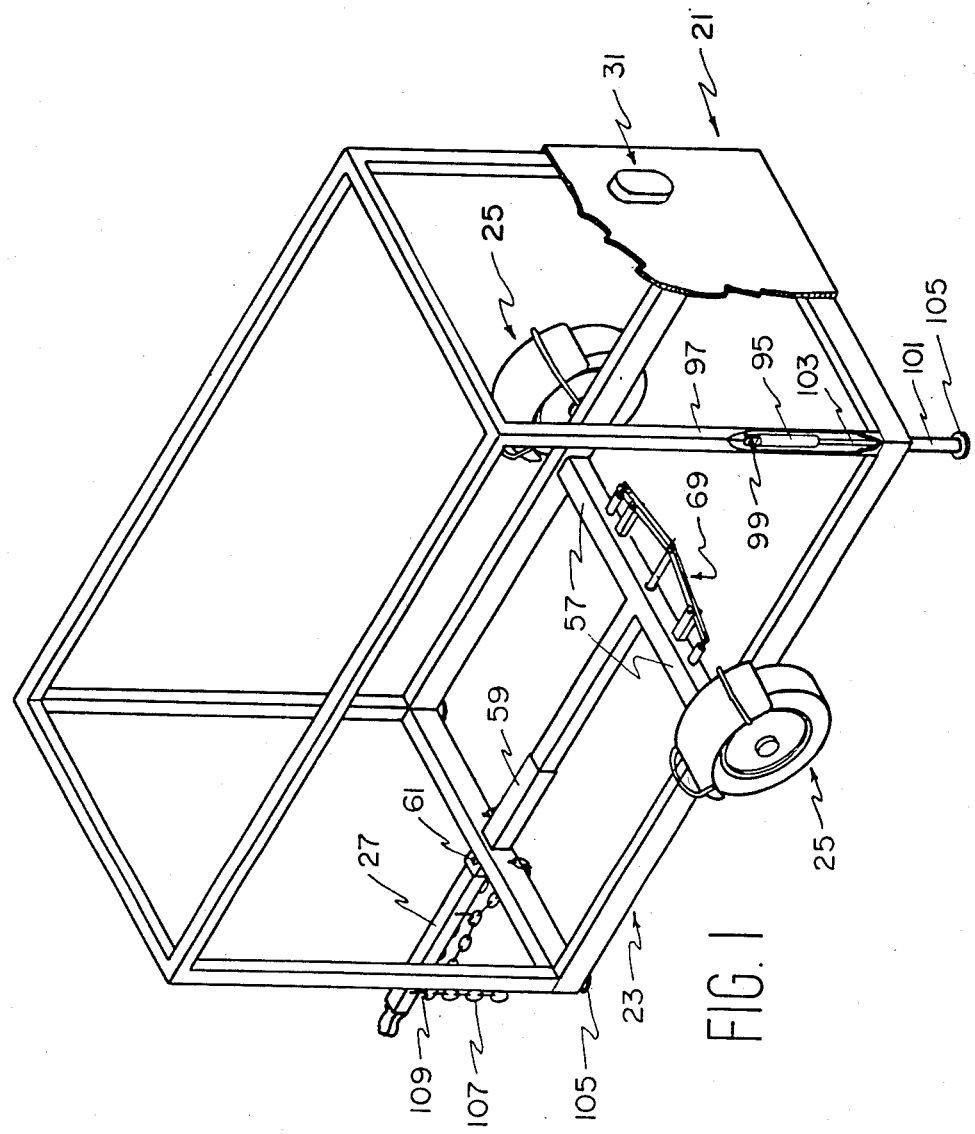
FIG. 1 is an isometric view, with sections removed and with fragmentary sections, of one embodiment of a trailerable structure with removable trailer components, and with the wheel retaining mechanism activated.
Figure 2:
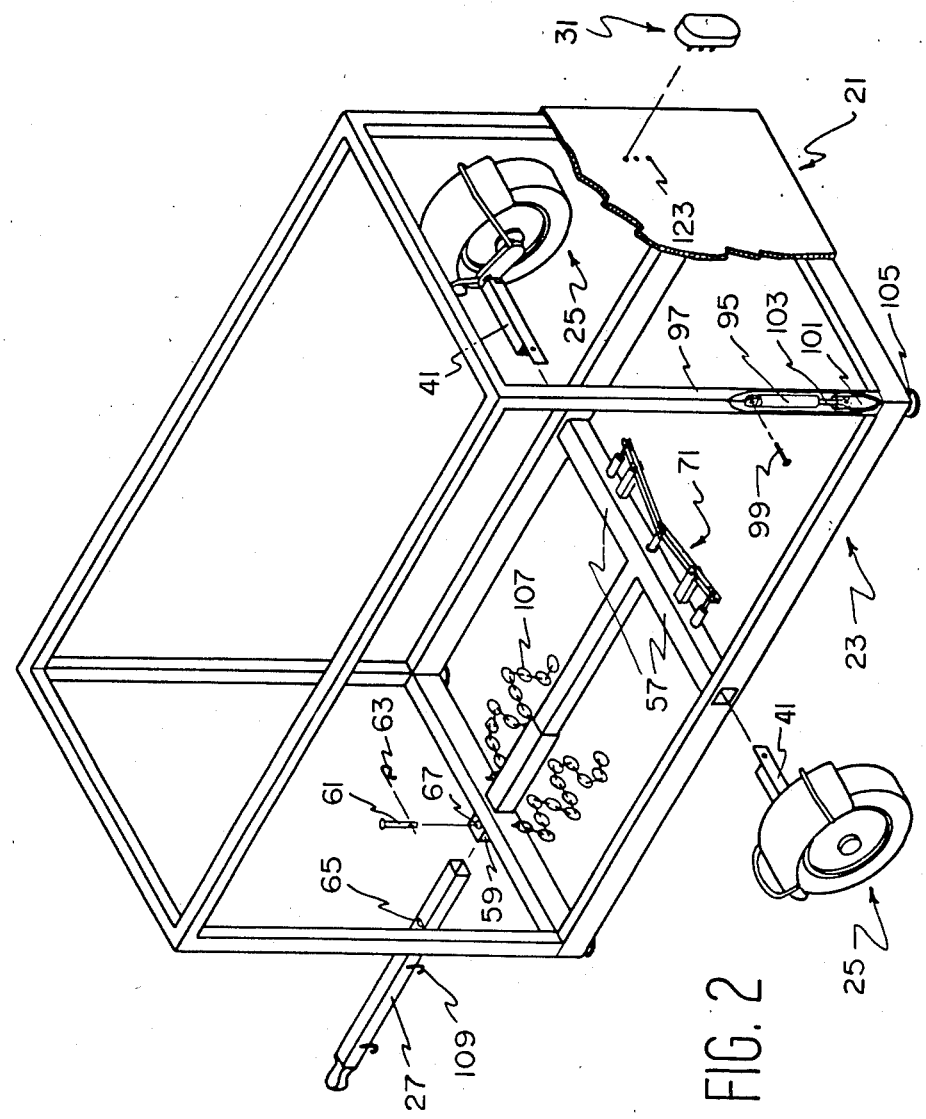
FIG. 2 is an isometric view of the structure of FIG. 1, but with the removable trailer components exploded away, and with the wheel retaining mechanism deactivated.

With reference to the drawings of FIGS. 1 and 2, and by way of example, one embodiment of the present invention encompasses a rectilinear structure, for use, for example, as small towable two-wheeled trailer generally 21, built upon support frame 23. Trailering components such as wheel assemblies 25, towing member 27, and light assembly 31 are removably attached to structure 21 or to frame 23. FIGS. 1 and 2 indicate the relative position of each of these components when they are in use in this embodiment. As detailed below, each of these components is constructed and designed for quick and easy attachment and detachment from frame 23 or from structure 21 by an individual without the need for tools.

Figure 3:
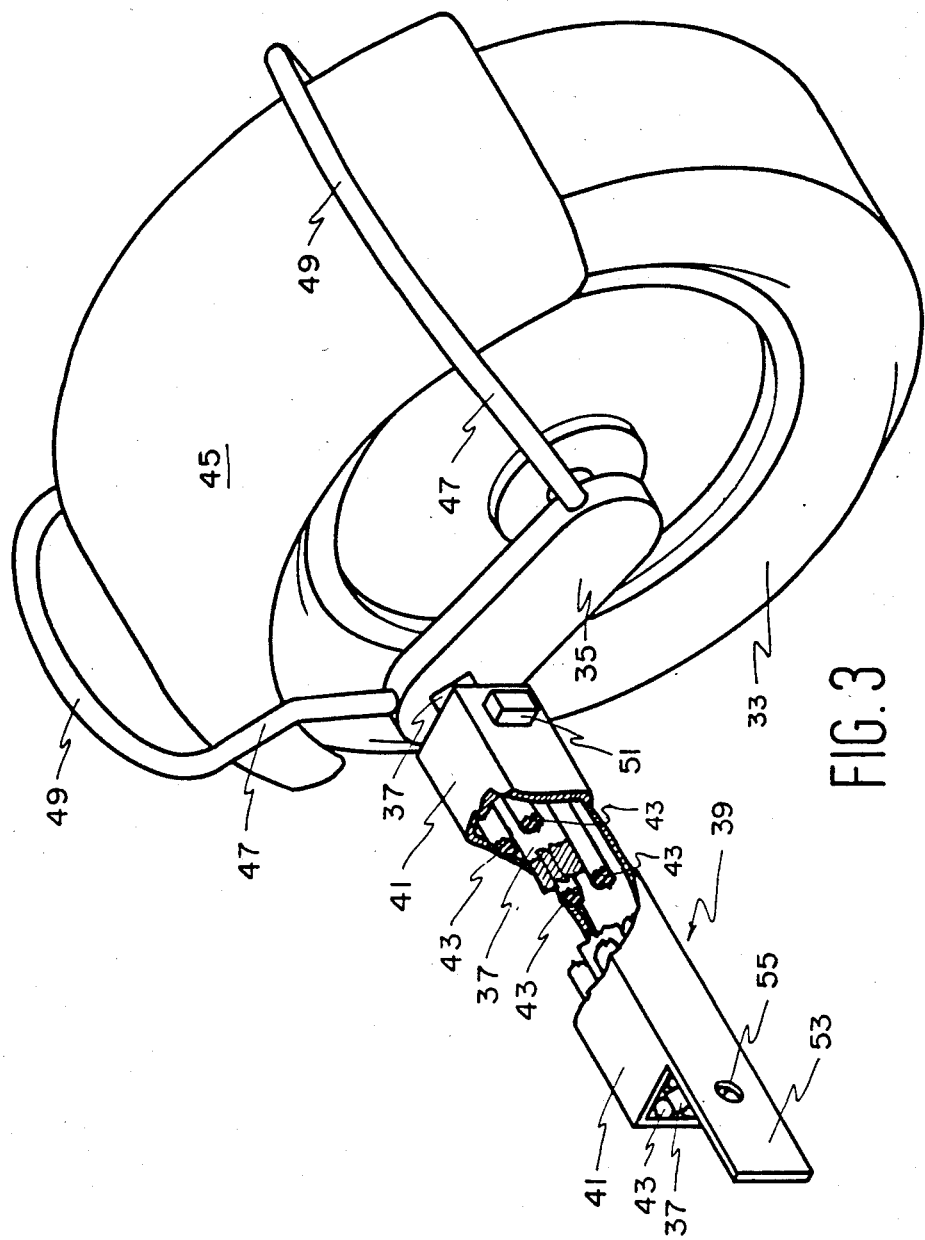
FIG. 3 is an enlarged, partially fragmentary isometric view, of a wheel assembly component of the kind shown in FIGS. 1 and 2.

A significant sub-assembly component of the present invention is wheel assembly 25, which is shown in substantial additional detail in FIG. 3. Wheel assembly 25 is comprised of wheel 33 which is rotatably mounted on an axle which is attached to torsion arm 35. Torsion arm 35 is in turn attached to angled torsion bar 37. Torsion bar 37 is a component of a standard, resiliently mounted, torsion suspension assembly 39. To better illustrate torsion suspension assembly 39, FIG. 3 has been partially cut away to detail its structure and operation. The angled torsion bar 37, in this case having a square cross-section, is resiliently secured within an angled, in this case again a square cross-section, suspension member 41 by means of a plurality of resilient cords 43. Resilient cords 43 limit the rotation of torsion bar 37 within suspension member 41.

When in use, suspension member 41 is non-rotatably mounted to frame 23. As a vertical load is applied to frame 23, resilient cords 43 are compressed, and the load is in turn transmitted to wheel 33 via torsion bar 37 and torsion arm 35. When the system is being towed this compressive characteristic of resilient cords 43 serves to absorb road shock energy and to dampen oscillations.

In preferred embodiments, wheel assembly 25 includes fender 45 which is supported by a plurality of tubular braces 47 which are affixed directly to torsion arm 35. With this construction, the movement of fender 45 is independent of the rotational movement of wheel 33 about its axle which is connected to torsion arm 35. As further shown in FIG. 3, tubular fender braces 47 are constructed to extend above the inside edge of fender 45 and than curve back down to meet the outside edge of the same fender 45 to thereby form handles 49. Handles 49 can be conveniently used for manually handling the entire wheel assembly 25 when it is detached from and independent of structure 21, and also during its attachment to and detachment from frame 23.

Referring once more to FIG. 3, included as a portion of suspension member 41 is an alignment stop 51. Alignment stop 51 is attached to the outside surface of suspension member 41 at the end proximal to torsion arm 35. Flange 53 is attached as an extension of the end of suspension member 41 which is distal to torsion arm 35. Retaining hole 55 is located in flange 53. The functions of alignment stop 51, retaining hole 55, and flange 53 are discussed below in conjunction with the wheel assembly suspension retention system.

Figure 4:
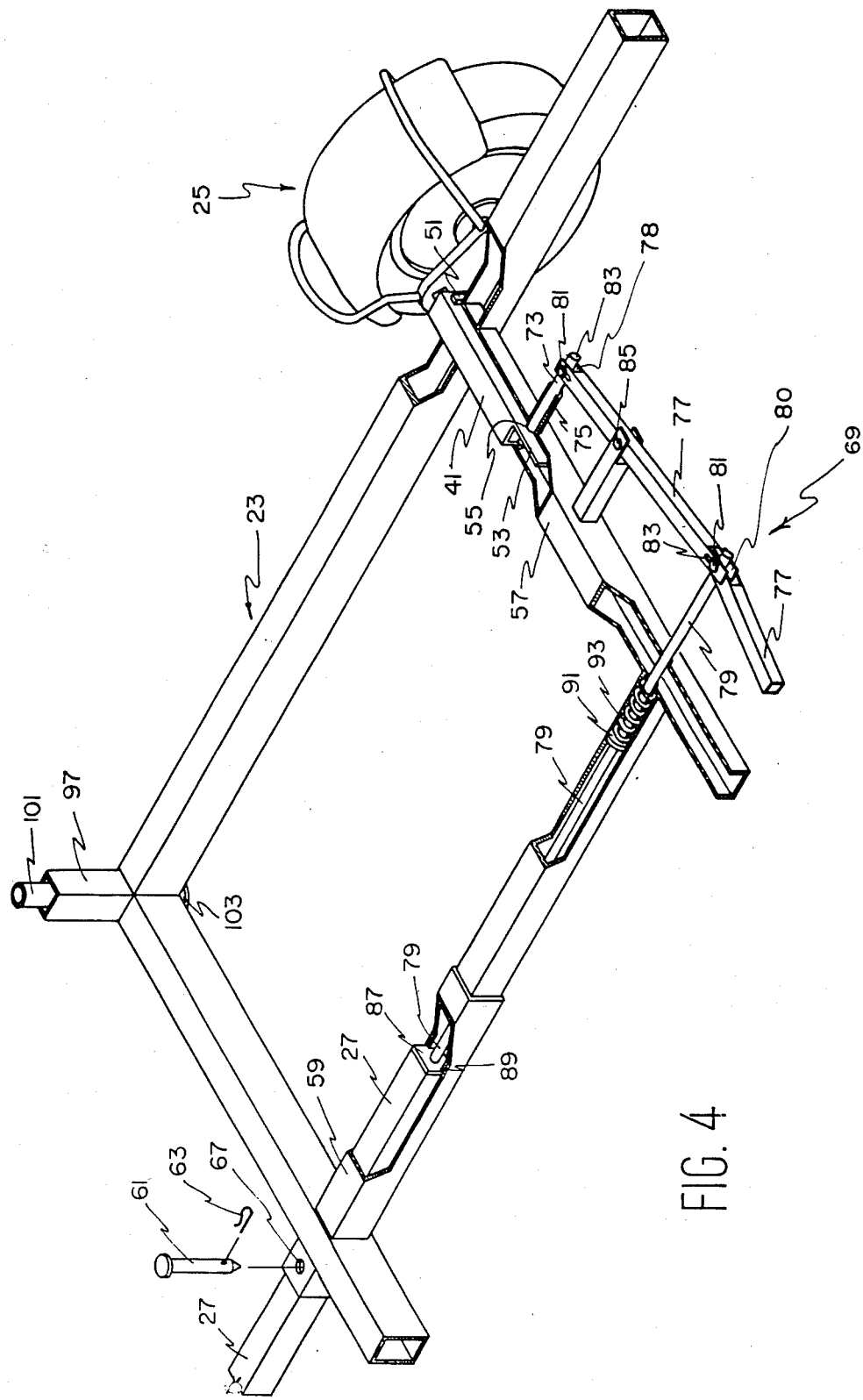
FIG. 4 is an enlarged partially fragmentary isometric view, of the wheel retaining mechanism as shown in FIG. 1 with the wheel retaining mechanism activated.
Figure 5:
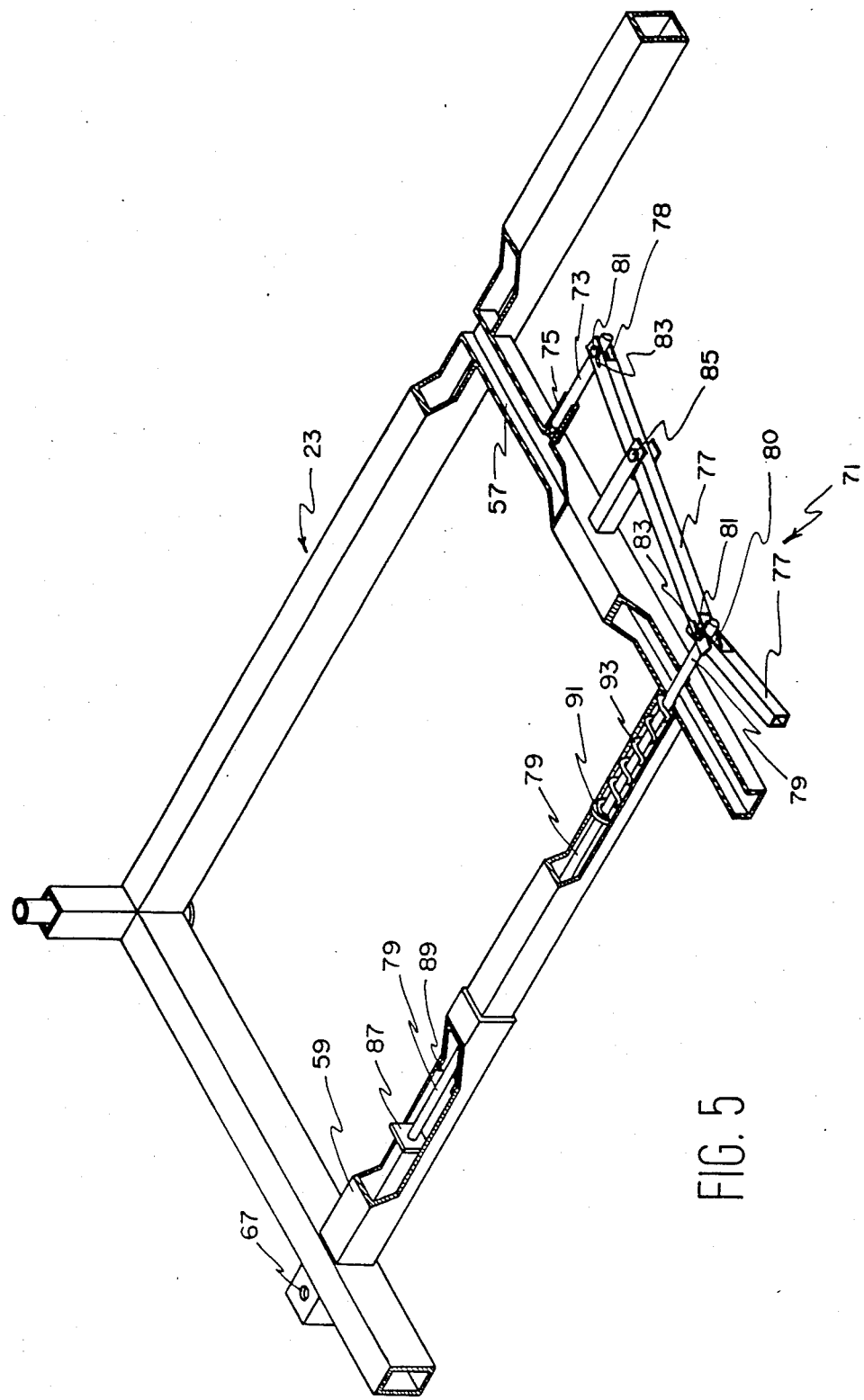
FIG. 5 is an enlarged partially fragmentary isometric view, of the wheel retaining mechanism as shown in FIG. 2 with the wheel retaining mechanism deactivated and the wheel assembly removed.

FIGS. 4 and 5 show additional details of the wheel assembly attachment and detachment mechanism shown in FIGS. 1 and 2, respectively. To allow the quick and easy removable attachment of wheel assemblies 25 without the use of tools, at least a pair of wheel assembly receiving suspension members 57 are incorporated as a part of frame 23 in structure 21. In the embodiment shown the square cross-section wheel assembly suspension member 41 is sized and designed to telescope non-rotationally into the square cross-section wheel assembly suspension member receiving tube 57. In a like manner, towing member receiving member receptacle 59 is included in the structure of frame 23 in a manner such that towing member 27 can be non-rotationally inserted into towing member receiving member receptacle 59. The quick and easy retention of towing member 27 in towing member receiving member receptacle 59 is by means of manually inserting towing member retention pin 61 through hole 65 (FIG. 2) in towing member 27 and hole 67 in towing member receiving member receptacle 59. Towing member retaining pin 61 is itself further retained in place, as shown in FIG. 4, by manually inserting hairpin type cotter pin 63 through a hole in retention pin 61.

A simple, fail-safe wheel assembly retention system is also detailed in FIGS. 1 and 4, in which an activated retaining mechanism 69 is shown to be securing wheel assemblies 25 to structure 21. This is accomplished by manually inserting suspension member 41 of wheel assembly 25 into wheel assembly receiving suspension member 57 until alignment stop 51 contacts frame 23. At this point, suspension retention pin 73 is aligned with retaining hole 55 carried by flange 53. The alignment of suspension retention pin 73, relative to suspension member tube 57, is maintained by alignment sleeve 75.

Insertion of suspension retention pin 73 into retaining hole 55 carried by flange 53 is obtained and controlled by the following described linkage, which, in this embodiment, is actuated by the position of towing member 27, as detailed below. The linkage includes rocker arm 77 which includes clevises 78 and 80 in each end. Clevis 78 is pivotally attached to suspension retention pin 73. Clevis 80 on the other end of rocker arm 77 is pivotally attached to push rod 79. Pivotal attachments on both ends of rocker arm 77 are by means of rocker arm clevis pins 81 positioned in slotted holes 83 in the clevises of rocker arm 77. Rocker arm 77 is itself pivotally mounted on a rocker arm pivot 85 which in turn is rigidly supported by suspension member 57. Slotted holes 83 in clevises 78 and 80 of rocker arm 77 allow the clevises to follow independent arcs about rocker arm pivot 85 while transmitting translative motion from push rod 79 to suspension retention pin 73, thereby causing retention pin 73 to move in the direction opposite to the direction of motion of push rod 79.

Retention of the second wheel assembly 25 is controlled by a second, mirror image rocker arm assembly. The second identical rocker arm 77 is also pivotally attached by a common rocker arm clevis pin 81 to push rod 79, and retains the second wheel assembly in the same manner as the first wheel assembly. In both instances push rod 79 passes translatively through clearance holes in wheel assembly receiving suspension member 57 and into an extension of towing member receiving member receptacle 59. Push rod end flange 87 is rigidly mounted on the end of push rod 79, but is sized to maintain a slidable clearance within the interior of towing member receiving member receptacle 59. Push rod end flange 87 centrally locates push rod 79 in towing member receiving member receptacle 59, and, as detailed below, provides a contact surface for push rod 79 adjacent the end of towing member 27. Push rod end flange 87 also provides a surface to contact push rod stop 89 which is formed by the telescoped extension of towing member receiving member receptacle 59.

To attach wheel assemblies 25 to frame 23, wheel retention mechanism is deactivated, as shown in FIGS. 2 and 5. Then suspension members 41 are manually aligned with and inserted into wheel assembly receiving suspension member 57, using, for example handles 49 to manipulate each wheel assembly 25. Each wheel assembly 25 suspension member 41 is inserted into wheel assembly receiving suspension member 57 until alignment stop 51 makes contact with frame 23. The wheel retention mechanism is then activated by inserting towing member 27 into towing member receiving receptacle 59 until it makes contact with and then translatively moves push rod end flange 87 to push rod stop 89, at which position hole 65 in towing member 27 is in alignment with hole 67 in towing member receiving member receptacle 59. This allows the insertion of towing member retaining pin 61. Additionally, the translative motion of push rod 79 in response to the insertion of towing member 27 into towing member receiving member receptacle 59 causes rocker arms 77 to rotate around rocker arm pivots 85 to thereby cause suspension retention pins 73 to be inserted into retaining holes 55 in suspension flanges 53 of wheel assemblies 25, as detailed in FIGS. 1 and 4, without the use of any tools.

Also attached to push rod 79 is an intermediate spring contact flange 91 which compresses helical compression spring 93 between spring contact flange 91 and the wall of wheel assembly receiving suspension member 57. Compressed helical compression spring 93 will cause push rod 79 and towing member 27 to move in the opposite direction when retention pin 61 is removed from towing member 27.

The deactivated retaining mechanism 71 is detailed in FIGS. 2 and 5. The deactivated retaining mechanism 71 allows the manual removal of wheel assemblies 25 from structure 21. In order to obtain the deactivated state, retention pin 61 is withdrawn from hole 67 and towing member 27 is withdrawn from member 59. This then allows compression spring 93 to expand and force push rod 79 forward, which, by means of attached rocker arms 77, withdraws suspension retention pins 73 from retaining holes 55 and allows the manual removal of wheel assemblies 25 quickly, easily, and safely from frame 23 without the need for tools.

Several fail-safe features are incorporated in the structure of the present invention. As previously described, insertion of towing member 27 into receptacle 59 causes the simultaneous retention of both wheel assemblies 25 in wheel assembly receiving suspension member 57. However, as a safety measure, flange 53 and other solid portions on suspension member 41 will prevent insertion of suspension retention pins 73 into retaining holes 55 if wheel assembly 25 is not fully inserted and properly positioned. When suspension retention pin 73 is held back by flange 53 or other solid portions of member 41, full insertion of push rod 79 and towing member 27 is prevented. Consequently, holes 65 and 67 cannot be aligned and towing member retaining pin 61 cannot be installed. Of course, towing of structure 21 is not feasible unless towing member 27 is retained, and thus structure 21 cannot be towed unless wheel assemblies 25 are properly positioned and retained. As an additional safety feature, a slidable solid member, not shown, may be biased within wheel suspension receiving member 57 to block insertion of suspension retention pin 73 until wheel assembly suspension member 41 is fully inserted therein to displace the slidable member.

To facilitate the insertion and the removal of wheel assemblies 25, jacks 95 are built into each corner of structure 21. FIGS. 1 and 2 show built-in conventional hydraulic jacks 95 contained within vertical structural tubes 97 of structure 21. Jacks 95 are attached to vertical structural tube 97 by jack support pins 99. Sleeve 101 is telescoped into vertical structural tube 97 and is able to withstand transverse loads. Sleeve 101 is connected to jack rod 103 at the top of sleeve 101 and connected to foot 105 outside of and below frame 23. Action of jacks 95 is translatively transferred to sleeve 101, and thereby to feet 105, to vertically raise or lower structure 21. Thus, when wheel assemblies 25 are to be removed, jacks 95 are activated and lowered sufficiently to allow the weight of structure 21 to be removed from wheel assemblies 25. After removal of wheel assemblies 25, jacks 95 can be reversed to lower structure 21 to the ground or other support surface. If needed, jacks 95 can also be used for leveling structure 21.

As seen in FIG. 1, safety chains 107 are connected directly to structure 21 to insure safety during towing in the event of failure of towing member retaining pin 61. During towing, chain 107 is hung along towing member 27 and connected to hooks 109 and thence to a tow vehicle, not shown. When structure 21 is at a use site, chains 107 may be stored under structure 21 as shown in FIG. 2.

Figure 6:
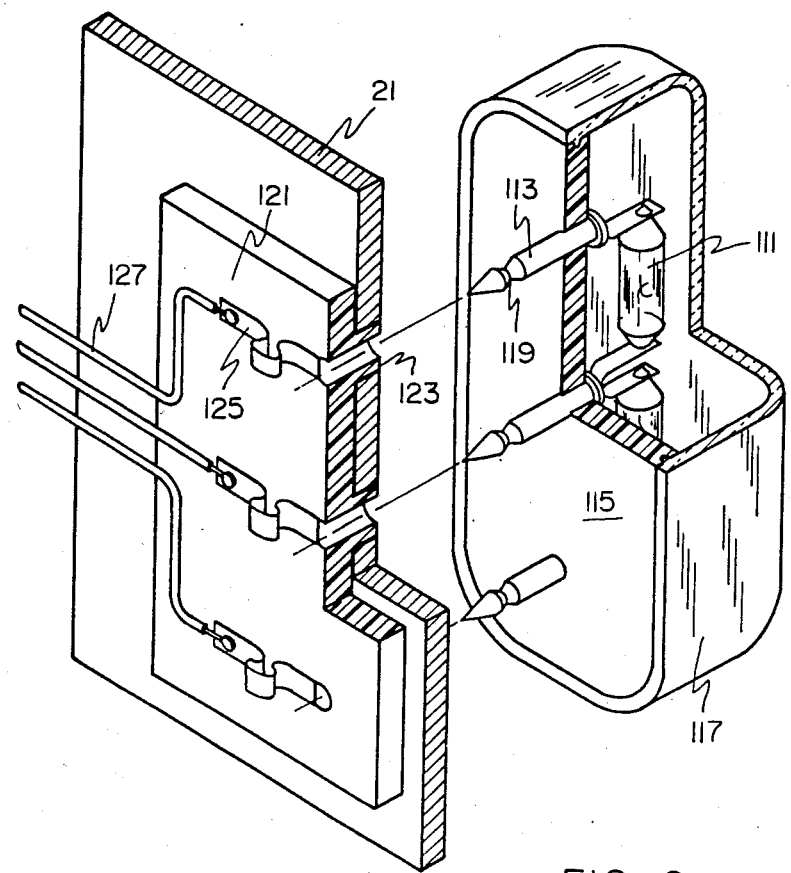
FIG. 6 is an enlarged, reverse isometric view with sections cut away of the light assembly component shown in FIGS. 1 and 2, and also of the portion of the structure for receiving the light assembly component.

When being towed on highways, light assembly components 31 are removably attached to structure 21. Light assemblies 31 attachment points are designed to have minimal visual impact when light assembly 31 is removed. Features of the light assembly 31 and of the attachment point are illustrated in FIG. 6, wherein light bulb 111 is conductively attached to metallic studs 113 which pass through and are attached to an electrically insulated light base 115. Light base 115 also supports an attached lens 117. Each stud 113 has a pointed end and a bevelled, circumferential groove 119. The light member is manually affixed to and removed from the attachment point of structure 21 easily, quickly and safely without the need for tools. An electrically insulating base 121 has insulated sleeves 123 which project through structure 21. Sleeves 123 can also be seen in FIG. 2. When light assembly 31 is installed, studs 113 pass through insulated sleeves 123 and make electrical contact with conductive spring clips 125. The conical surface of the points on studs 113 force spring clips 125 back and allow studs 113 to penetrate until spring clips 125 snap into circumferential grooves 119. Spring clips 125 are supported by base 121 and are also conductively attached to electrical wires 127. Spring clips 125 are also retained in bevelled, circumferential grooves 119 of studs 113 and act to hold light assembly 31 in place against release from structure 21 due to normal vibration and other forces encountered during the towing of structure 21. However, moderate force, applied along the longitudinal axis of studs 113 and away from structure 21, allows the bevel of circumferential grooves 119 to dislodge from spring clips 125. It is therefore seen that this arrangement allows quick and easy manual attachment and removal of light assembly 31 to and from structure 21. Brackets to support license plates and other trailer components can also be supported by a stud and clip structure similar to that of light assembly 31.

To summarize the operation of the embodiment of the present invention as thus far presented, the following would be a normal operational sequence. Structure 21 as shown in FIG. 1, with all wheel assemblies 25, towing member 27, light assemblies 31, and safety chains 107 attached, is towed to the site of use with all jacks 95 retracted and towing member 27 and safety chains 107 coupled to a towing vehicle, not shown. At the site of use, jacks 95 raise structure 21 and it is uncoupled from a tow vehicle. Safety chains 107 are unhooked and pushed under structure 21. Hairpin cotter 63, towing member retaining pin 61, and towing member 27 are next removed by hand. This deactivates retention system 71 of structure 21, as illustrated in FIGS. 2 and 5. The removal of towing member 27 from towing member receiving member receptacle 59 causes compressed compression spring 93 to urge push rod 79 forward. This deactivates suspension retention system 71 by causing rocker arms 77 to pivot, thereby causing suspension retention pins 73 to be retracted from retaining holes 55. Then, with structure 21 still raised on jacks 95, wheel assemblies 25 are easily manually removed from suspension members 41. Structure 21 is then lowered on, and levelled if necessary, by its jacks 95. After removing trailering light assemblies 31, structure 21 is ready for use in a manner and with an appearance which does not suggest that it was ever a part of a trailer.

Preparing the structure for transit is substantially a reverse operation in which, all light assemblies 31 and other components are installed and structure 21 is raised on its jacks 95. Suspension members 41 of wheel assemblies 25 are then manually inserted into wheel receiving suspension members 57 of frame 23 until alignment stops 51 contact frame 23. Towing member 27 is then manually inserted into towing member receiving member receptacle 59 until push rod end flange 87 contacts push rod stop 89. This activates suspension retention system 69 to retain wheel assemblies 25 via the rocker arms 77 which cause the suspension retention pins 73 to be inserted through retaining holes 55. Manual insertion of towing member retaining pin 61 and its hairpin cotter 63 locks the retention system, thereby securing wheel assemblies 25 to frame 23. Jacks 95 are then retracted, towing member 27 and safety chains 107 are attached to a tow vehicle, and structure 21 is ready for towing. This procedure is accomplished easily, quickly and safely by hand and without the need for tools.

OTHER EMBODIMENTS

Another embodiment of the present invention is illustrated in FIGS. 7, 8 and 9. In this embodiment, frame structure 21 is fitted with suspension members 57 for wheel assemblies 25 and towing member receiving member receptacle 59 for an articulating towing member 27A. Retention of wheel assemblies 25 is achieved without the use of tools by means of suspension retention pins 73A which are manually inserted through holes 75A in suspension member 57 and aligned holes 55 in the suspension flanges 53 of wheel assemblies 25. Retainment of suspension retention pins 73A is, for example, by hairpin cotters 63. During towing, vertically articulating towing member 27A is prevented from inadvertent articulation by locking pin 129. Crank arms 133 are rigidly attached on opposite sides of the joint of articulating towing member 27A. Towing member jack 135 is pivotally attached between crank arms 133. Articulating towing member 27A is coupled to the tow vehicle hitch 128.

As with the previous embodiment, all components are attached during towing. At the site of use, locking pin 129 is removed and articulating towing member 34A is articulated about pivot pin 131 by the action of towing member jack 135 against crank arms 133. Extension of towing member jack 135 raises the adjacent end of structure 21, causing it to rotate about the wheels until the opposite end of structure 21 contacts the ground or other horizontal support surface 137 upon which it rests and wheel assemblies 25 are raised clear of horizontal support surface 137 as shown in FIG. 8. Wheel assemblies 25 can then easily be manually unpinned and removed. Retraction of towing member jack 135 lowers structure 21 to horizontal surface 137 and allows uncoupling of articulating towing member 27A, as shown in FIG. 9, from a tow vehicle, not shown. Removal of towing member retaining pin 61 then allows easy removal of articulating towing member 27A. During lowering of structure 21, release of the brakes on the tow vehicle will allow structure 21 to easily pivot about its end opposite to the towed end as structure 21 is lowered to horizontal surface 137. While this embodiment is well suited to delivering structures 21 to be permanently left in place, reassembly is easily accomplished as a reversal of the steps of disassembly. Additionally, if structure 21 is used for hauling, articulating towing member 27A can be used to dump loads or position structure 21 for easy loading and unloading. It is also noted that flat frame structure 21, as shown in FIG. 9, is easily stored either flat or on its edge when it is not in use.

Figure 10:
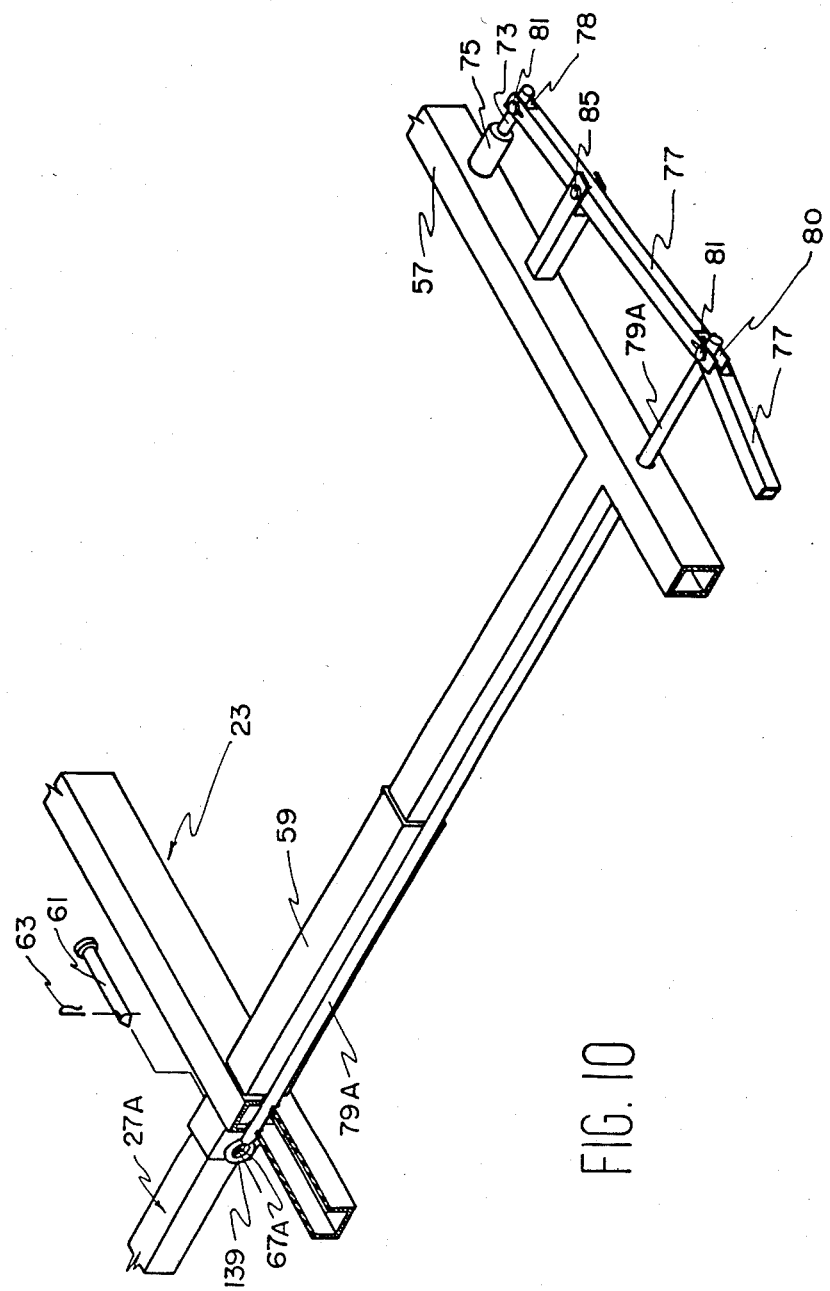
FIG. 10 is an enlarged isometric fragmentary view, of yet another modification of the present invention showing an activated wheel retaining mechanism for use with an articulating towing member of the type shown in FIGS. 7, 8, and 9.

Another embodiment of the present invention, as shown in FIG. 10, combines the features of articulating towing member 27A and the suspension system which is detailed in FIGS. 4 and 5. FIG. 10 shows a fragmentary view of the interfacing of these systems. A springless and flangeless push rod 79A is translatively mounted parallel to, rather than within, towing member receiving member receptacle 59. One end of push rod 79A is pivotally attached to rocker arms 77. Rigidly attached to the other end of flangeless push rod 79A is push rod eye 139. The length of push rod 79A is such that suspension retention pins 73 are fully inserted when push rod eye 139 is in alignment with hole 67A in towing member receiving member receptacle 59. To release wheel assemblies 25, towing member retaining pin 61 is partially removed and flangeless push rod 79A is manually pulled forward. Articulating towing member 27A is left in place. In this position push rod 79A is extended over hole 67A. Once wheel assemblies 25 are removed, push rod 79A can be pushed back and towing member retaining pin 61 can be fully inserted to allow articulating towing member 27A to safely lower structure 21 to a horizontal surface, as previously described and shown in FIG. 9. Full insertion of towing member retaining pin 61 is thus prevented unless wheel assemblies 25 are fully installed and retained or completely removed. This combined arrangement allows the use of the fail-safe suspension retention system as previously discussed with an articulating towing member system.

Figure 11:
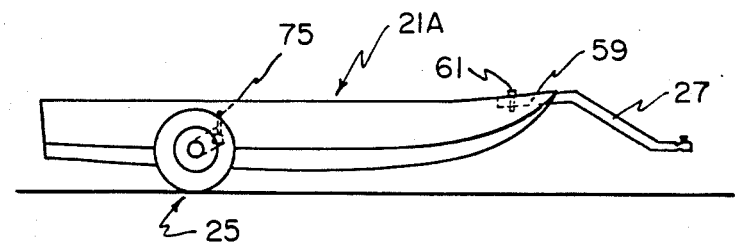
FIG. 11 is a diagrammatic side elevational view of yet another embodiment of the present invention integrated with a boat structure, with removable wheel assemblies and a removable towing member.
Figure 12:
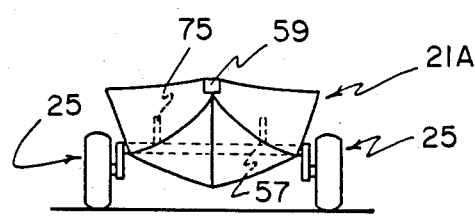
FIG. 12 is a front elevational view of the structure in FIG. 12, with the towing member removed.

Another embodiment of the invention is illustrated in FIGS. 11 and 12. In this embodiment a boat hull structure 21A, is fitted with a frame, including suspension members 57. Suspension members 57 are in turn fitted with suspension retaining pin alignment sleeves 75 which in this embodiment extend vertically above the projected water line of the boat. Also fitted into the frame of boat hull structure 21A, is towing member receiving member receptacle 59. Removal and attachment of wheel assemblies 25 is easily accomplished while hull 21A is floating upon the water. The need for jacks is eliminated. Clip-on trailer lights which are not shown are easily attached to hull 21A during towing.

Figure 13:
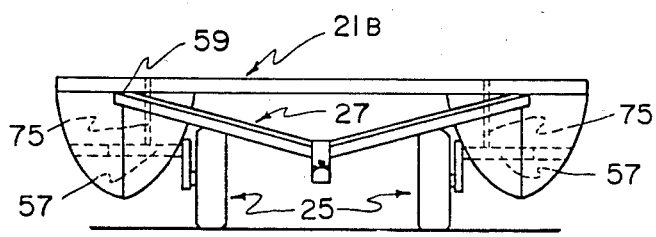
FIG. 13 is a diagrammatic front elevational view of yet another embodiment of a structure, which is a pontoon boat, with removable wheel assemblies and removable towing member attached according to the present invention.

Yet another embodiment of the invention is illustrated in FIG. 13 and indicates a placement of wheel assemblies on structure 21B which is a pontoon boat. The structure is otherwise similar to that described in FIGS. 11 and 12.

Figure 14:
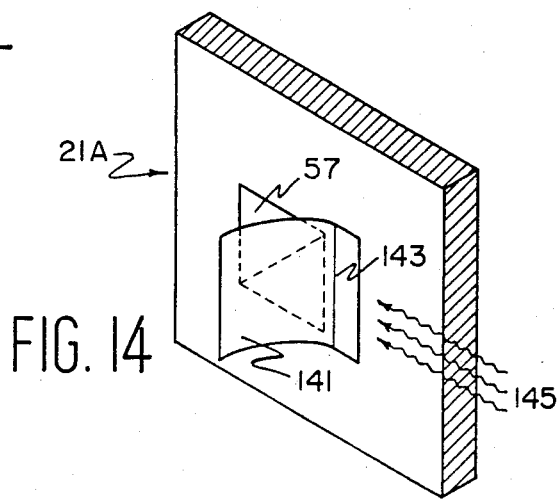
FIG. 14 is an enlarged, fragmental, isometric diagrammatic representation of a receiving member cover for use on boat structures according to the present invention.

A low-drag cover for use over the openings of suspension member tubes 57 of structures 21A or 21B is illustrated in FIG. 14. The hole created by the penetration of suspension member tube 57 through hull 21A can be smoothly covered by flexible flap 141. The forward edge of flap 141 is adhered to hull 21A such that flap 141 hinges about line 143. Potential water flow 145, as indicated by the arrows, holds flap 141 smoothly to the hull during normal use in the water. Flap 141 is easily folded out of the way for installation of wheel assembly 25.

Thus it can be seen that the trailering system of the invention provides a quick, simple, safe, attractive, and economical means to move structures. Many other variations are possible. For example, structures fitted with several sets of suspension member tubes 57 can be removably fitted with several sets of wheel assemblies 25.

Often moved structures such as sales offices, sales booths, display booths, telephone booths, ticket booths, portable toilets, wedding arbors, theatrical stages, podiums, gazebos. bandstands, food service stands, portable bars, spas and hot tubs, guard stations, recreational campers, and storage buildings, would all be significantly improved by incorporation of the present invention. Other types of structures could also use the removable trailer components according to the invention. For example, holding tanks and storage tanks could be used like stationary tanks and yet be easily mobile. Floating structures such as piers, swimming floats, boats, and floating bridges could all be made to be easily mobile on land without the expense and inconvenience of separate specialized trailers. Building modules could also be easily and inexpensively transported using the present invention. Portable signs could be moved yet not appear to be temporary when in use. Portable weigh scales and trash dumpsters could also benefit from the invention. These structures could all be easily portable as they could be towed like conventional trailers. However, at the site of use, these structures could appear to be permanently installed structures since all of the trailer components could be removed and the floor level of the structures, when static, would be approximately at ground level. This improved appearance is important to the functional use of many of these structures. The safety of entering and exiting these structures would be improved by maintaining them at ground level, thereby eliminating the climb up and down from structures mounted on trailers, trucks or wheels. The safety problems and expense of hoisting or lifting structures onto trailers or trucks, and of building structures so that they can be hoisted or lifted are also greatly improved by the present invention. Theft would also be minimized as once they are at their use sites the structures are not on wheels ready to be rolled away. The trailer components used with the present invention are easily stored within a separate structure, or can be used with another structure.

While the invention has been particularly shown and described with reference to preferred embodiments thereof, it will be understood by those skilled in the art that the foregoing and other modifications or changes in form and detail may be made therein without departing from the spirit and scope of the invention as claimed, except as precluded by the prior art.

What is claimed is:

1. A structure which can rest upon a surface and which avoids the appearance of being a trailer, but which is never-the-less capable of having wheels, a towing bar and other trailer components removably attached to it, without the need for tools, to allow it to be towed like a trailer, comprising in combination:
   a frame;
   wheel assembly receiving means carried by said frame for detachably receiving one or more wheel assemblies, which wheel assembly receiving means further includes means for quickly and easily attaching and detaching a wheel assembly to said receiving means without the need for tools;
   wheel locking means for locking a wheel assembly to each said wheel assembly receiving means which is carried by said frame;
   towing member receiving means carried by said frame for detachably receiving a towing member; and
   actuation means carried by said frame for actuation of said wheel locking means, said actuation means being linked to said towing member receiving means; whereby, insertion of a towing member into said towing member receiving means received within said wheel assembly receiving means, automatically actuates said wheel locking means, and removal of a towing member from said towing member receiving means automatically deactivates said wheel locking means, and whereby further said frame can be towed when one or more wheel assemblies and a towing member is attached thereto, or rest upon a surface when all wheel assemblies are detached therefrom.

2. The structure of claim 1, wherein a towing member is connected to said towing member receiving means, and wherein further one or more wheel assemblies is connected to said wheel assembly receiving means, whereby said locking means is actuated and said one or more wheel assembly is locked to said wheel assembly receiving means.

3. The structure of claim 2 wherein said towing member receiving means includes a receptacle, and wherein further said towing member is sized and designed to enter said receptacle and make detachable connection therewith.

4. The structure of claim 3 wherein means are provided for detachably locking said towing member to said towing member receptacle.

5. The structure of claim 3 wherein said wheel locking means is activated and deactivated by insertion and removal of said towing member into and from said towing member receiving receptacle in said frame.

6. The structure of claim 3 wherein said towing member is disabled from being locked to said receptacle when said wheel assemblies are not properly connected to said wheel assembly receiving means.

7. The structure of claim 6 wherein receiving means for manually attaching and detaching a road light is included in said structure.

8. The structure of claim 6 wherein said means for receiving a road light includes receiving means for attaching and detaching said light to said structure, means for resisting displacement of said light from said receiving means; and means for providing electrical connection to a light placed into said receiving means.

9. The structure of claim 8 wherein said light receiving means includes a socket which is substantially flush with the surface of the structure.

10. The structure of claim 1 wherein there are two transversely spaced apart means for receiving a wheel assembly.

11. The structure of claim 10 wherein a wheel assembly is connected to said frame at each of said two wheel assembly receiving means.

12. The structure of claim 1 wherein a wheel assembly is connected to said frame at each said means wheel assembly receiving.

13. The structure of claim 12 wherein said structure further includes means independent of said wheel assemblies for lowering and raising said structure to allow it to rest upon a surface or to be raised from a surface to allow the manual removal or attachment of said wheel assemblies.

14. The structure of claim 13 wherein said means for lowering and raising said structure includes one or more jack mechanism.

15. The structure of claim 1 wherein a towing member is connected to said towing member receiving.

16. The structure of claim 15 wherein said towing member includes means for vertically articulating said towing member, whereby said towing member can be utilized to lift one end of said frame to allow the manual removal and attachment of said wheel assemblies.

* * * * *

UNITED STATES PATENT AND TRADEMARK OFFICE
CERTIFICATE OF CORRECTION

PATENT NO. : 4,807,894

DATED : February 28, 1989

INVENTOR(S) : Douglas W. Walker

It is certified that error appears in the above-identified patent and that said Letters Patent is hereby corrected as shown below:

Column 13, Claim 1, line 35, after "means" insert -- after each said wheel assembly has been received within said wheel assembly receiving means, --.

Column 14, Claim 15, line 46, after "receiving" insert -- means --.

Signed and Sealed this

Twenty-first Day of November, 1989

*Attest:*

JEFFREY M. SAMUELS

*Attesting Officer*     *Acting Commissioner of Patents and Trademarks*